F. W. MANN & M. L. CHAPPELL.
PROCESS FOR THE PRODUCTION OF AROMATIC BODIES FROM PETROLEUM OILS.
APPLICATION FILED NOV. 12, 1917.

1,257,906.

Patented Feb. 26, 1918.

INVENTORS.
Frederick William Mann
Marvin Lee Chappell
BY
Booth & Booth
ATTORNEYS.

UNITED STATES PATENT OFFICE.

FREDERICK WILLIAM MANN, OF BERKELEY, AND MARVIN LEE CHAPPELL, OF EL SEGUNDO, CALIFORNIA, ASSIGNORS TO STANDARD OIL COMPANY, OF RICHMOND, CALIFORNIA, A CORPORATION OF CALIFORNIA.

PROCESS FOR THE PRODUCTION OF AROMATIC BODIES FROM PETROLEUM-OILS.

1,257,906.               Specification of Letters Patent.        Patented Feb. 26, 1918.

Application filed November 12, 1917. Serial No. 201,477.

*To all whom it may concern:*

Be it known that we, FREDERICK WILLIAM MANN and MARVIN LEE CHAPPELL, citizens of the United States, residing, the said MANN at Berkeley, in the county of Alameda and State of California, and the said CHAPPELL at El Segundo, Los Angeles county, California, have invented certain new and useful Improvements in Processes for the Production of Aromatic Bodies from Petroleum-Oils, of which the following is a specification.

Our invention relates to the art of manufacturing aromatic bodies from petroleum oils containing oils of the carbocyclic series and is particularly applicable for the production of benzol, toluol, xylol and other aromatic bodies, which are used extensively in the manufacture of dyes, explosives and drugs. The carbocyclic series consists of aromatic bodies, naphthenes, and other ring compounds, all of which are converted, or partly converted by our process into aromatic oils, such as benzol, toluol, xylol, etc.

Our present invention is an improvement upon our former process of dehydrogenation under vacuum, disclosed and claimed in Patent No. 1,214,204, granted January 30, 1917, and is carried out according to the method of procedure described in our copending application for an apparatus patent, Serial Number 166,131, filed May 3, 1917, and allowed October 5, 1917, which application has now eventuated in Patent No. 1,249,444, dated Dec. 11, 1917. Reference may be had to these prior disclosures, though in order to fully disclose our present process and its distinctive novelty it will be necessary herein to repeat much of the subject matter of said prior patent and application.

Our invention consists, in general, in the dehydrogenation of the petroleum oils stated, under pressure below atmospheric, at high temperatures in the presence of air which is mixed with the products of combustion required to maintain the necessary temperature and in the presence also of a contact substance. In the best practice of our process, the essentials are; a pressure of from 1 to 4 inches of mercury below atmospheric pressure, that is 734.6 to 658.4 millimeters of mercury absolute pressure: a temperature ranging from 600 to 750 degrees centigrade: a volume of air from 500 to 800 cubic feet for each 15 or 20 gallons of oil introduced, which is mixed with the products of combustion required to maintain the above given temperature; and a contact substance of catalytic nature composed of the lower oxid of a metal, preferably the lower oxid of nickel. The catalyzer is prepared by impregnating porous material, such as firebrick, pumice stone, etc., with the soluble salts of nickel, iron or copper, or with mixtures of these soluble salts. We prefer to use the nitrates of these metals for impregnation of such porous material, and if one metal alone is employed we prefer, as we have above stated, to use nickel.

After the impregnation, the contact mass is heated to a temperature ranging from 500 to 600 degrees centigrade, in the presence of a reducing agent such as the vapors of petroleum oils, carbon monoxid and water vapor. By the action of such reducing agents the nitrates of the metals are converted into their lower oxids.

We are aware that certain processes are now well known for the partial conversion of petroleum oils at atmospheric and above atmospheric pressure, into oils of low boiling points which contain small percentages of benzol and toluol, but we have found that it is not commercially profitable to separate this benzol and toluol from the undesirable oils. Such oils can be used only for solvents and as fuel for internal combustion engines. Further, some of the undesirable oils formed under atmospheric or above atmospheric pressure have boiling points similar to benzol and toluol and can be nitrated, but explode when heated to the boiling point of nitro-benzol. In general we employ a reduced atmospheric pressure as stated to prevent the formation of these undesirable compounds, which can not be separated from benzol and toluol by fractional distillation, and which when nitrated, form dangerous explosives.

A reduced pressure of more than 4 inches of mercury below atmospheric may be employed with equally as good results but such reduced pressures are more expensive to maintain.

The advantages of this process over our former process of Patent No. 1,214,204, above mentioned, are as follows:—First—a saving in fuel. Second—prolongation of the life of the converter on account of being properly interiorly insulated by suitable lining. Third—a more constant temperature maintenance throughout the sections of the converter containing the contact mass, by which increased yields of the desired aromatic products are obtained. Fourth—a saving in labor.

The reaction for the conversion of petroleum oils into aromatic bodies according to our process is expressed in the following examples:—

$$C_nH_{2n} + O_x = C_nH_{2n-6} + (H_2O)_x$$

or $$C_6H_{12} + 3O = C_6H_6 + 3H_2O.$$

In order to obtain the best results we must have closely regulated temperatures as stated, and closely regulated proportions of fluid fuel and air, so that combustion is complete in the lower section of the converter, and closely regulated quantities of air and petroleum oil as stated, so that dehydrogenation takes place as shown in the above reactions.

In the accompanying drawing, to which reference is hereby made, is shown an apparatus suitable for carrying out our process.

Figure 1 is a general view, more or less diagrammatic, of the apparatus, the vertical converter being in section.

Fig. 2 is a vertical sectional elevation of a slightly modified form of the converter of the apparatus.

1 is an oil storage tank which is filled by means of a pipe 2. From the storage tank 1 leads a pipe 3, controlled by a valve 4, to a preheater 5 which contains a steam coil 6 connected with a steam boiler, not shown, and controlled by valves 7 and 8.

From the preheater 5 leads a pipe 9 to a spray nozzle 10 with a pipe branch connection 11, controlled by a valve 12, which connects with a source of air supply, not shown. The flow of oil from pipe 9 is controlled by valve 13.

14 is a cylindrical iron or steel shell of the converter, said shell being lined at 15 with fire brick or kieselguhr brick, or both. The upper section of the converter is filled with a suitable contact mass 16, which is of the nature described in our prior patent and hereinbefore referred to, namely a porous body impregnated with the lower oxid of a metal or metals, preferably the lower oxid of nickel.

17 is a brick arch which supports the contact mass. 18 is checkered brickwork which forms part of the internal combustion or heating chamber of the converter, by which is brought about a uniform heating and maintaining of the desired temperature of reaction in the upper or contact section of the converter.

19 is a burner through which oil and air, or a hydrocarbon gas and air are introduced by means of branch pipes 20 and 21 respectively, which pipes are controlled by valves 23 and 22.

24 is a pyrometer which indicates the temperature in the section of the converter containing the contact mass 16. From the converter issues a pipe 25 connected to branch pipes 26 and 27 controlled by valves 29 and 28. Branch pipe 27 opens into the air. Branch pipe 26 runs to a receiver 30. From receiver 30 runs a pipe 31 to a coiled condenser 32 contained in condenser box 33. From the condenser box 33, a pipe 34 runs into a receiver 35. From the top of receiver 35 leads a pipe 36 to the suction end of a compressor 37 which discharges into a pipe 38, and through a coiled pipe 39 which is contained in a condenser box 40.

From condenser box 40 leads a pipe 41 to the bottom and along the bottom of a tank 42, the pipe in the bottom of the tank being perforated. From the top of the tank 42 leads a pipe 43 controlled by valve 44, to gas holder 45. From the top of gas holder 45 leads a pipe 46 to any place where it may be desired to burn the gas that collects in the said holder 45.

Our process as carried out in this apparatus, is as follows:—Petroleum oils or petroleum distillate coming from storage tank 1 flows through pipe 3 into pre-heater 5 where it is heated to a temperature ranging from 150 to 250 C., and then flows through pipe 9 into spray nozzle 10 and is regulated by means of valve 13. This flow may be effected either by gravitation or under pump pressure, and the oil may be introduced into the converter either in a liquid state, or in the form of a vapor or gas spray, and mixed with a certain regulated quantity of air, namely 500 to 800 cubic feet of air for each 15 to 20 gallons of oil introduced. The air is admitted through pipe 11, and regulated by means of valve 12.

The temperature inside the converter is maintained at from 600 to 750 centigrade, by means of burner 19 through which is introduced fuel-oil and air, or a hydrocarbon gas and air, by means of pipes 20 and 21 which connect with a source of fuel oil and air, or a hydrocarbon gas and air, respectively. The flow of fuel oil and air, or a hydrocarbon gas and air, is controlled by means of valves 22 and 23 so that there is brought about a complete combustion without using an excess of oxygen according to reaction:

$$CH_4 + 2O_2 = CO_2 + 2H_2O$$

or $$C_{21}H_{44} + 32O_2 = 21CO_2 + 22H_2O$$

At the same time a pressure of from one to four inches of mercury below atmospheric pressure, that is 734.6 to 658.4 millimeters of mercury absolute pressure is maintained in the converter. This pressure below the atmospheric is maintained by means of the suction pipe 36 of compressor 37. The catalytic mass 16 in the converter becomes coated with carbon after the oil has been passing through it for some time. It is necessary to clean the mass by burning the accumulated carbon, at the end if each run ranging from 40 to 90 minutes duration. This is accomplished by closing valves 13 and 23 in the branch pipes 9 and 20 whereby the flow of petroleum oil and fuel oil to the converter is interrupted.

Simultaneously the valve 28 of the branch pipe 27 is opened and the valve 29 of the branch pipe 26 is closed. The supply of air to the converter is increased through branch pipe 11 by means of valve 12. The air acts on the carbon coating of the catalytic mass according to the reactions $$C + O = CO$$
$$C + O_2 = CO_2$$

The temperature in the converter rises from 750 to 850 C. during the burning or oxidation of the carbon. At the end of from 20 to 40 minutes, the catalytic mass is freed from the coating of carbon. The quantity of air is then reduced to a point between 500 and 800 cubic feet, and petroleum oil, oil spray or oil vapor and fuel oil is again turned into the converter in like manner and proportion as when a fresh start is made.

By the passage of petroleum oils or petroleum distillates through the catalytic mass, as described, we produce 20 to 35% of a permanent hydrocarbon gas mixed with the products of combustion, carbon dioxid and nitrogen, 50 to 75% of aromatic bodies which pass from the converter by branch pipe 26 into the tank 30 where a portion of said aromatic bodies is condensed. From the tank 30 the uncondensed aromatic bodies and the gas pass through the condensing coil 32 in tank 33 where more of said aromatic bodies are condensed and run into the receiver 35. The permanent gas coming from 35 retains a portion of the light aromatic oils which is removed by the compressor 37 and being condensed in tank 40 by the condenser coil of pipe 39 is absorbed in the scrubber or receiver 42 which contains scrubbing oil and is kept under a pressure of 50 to 80 pounds per square inch by the compressor 37. By means of the excess discharge valve 44, the dry permanent gas is carried to the gas holder 45 through pipe 43.

The aromatic bodies thus produced are collected in the tank 30 and receivers 35 and 42 and are pumped into a storage tank. Finally they are fractionated, treated and refractionated by well known methods.

Other well known methods and apparatus may be used in connection with our process and converter for the collection of the aromatic bodies produced, and to bring about the circulation of the gas, vapors and oils through the apparatus and to maintain the pressure of from one to four inches mercury below atmospheric pressure, as, for instance, by means of exhausters.

In place of the construction of the vertical L-shaped converter shown in Fig. 1, we may construct the converter in the shape of a straight, vertical cylinder, as shown in Fig. 2.

We claim:—

1. The process of producing aromatic bodies which consists in the dehydrogenation of petroleum oils containing oils of the carbocyclic series, under a pressure below atmospheric, at temperatures ranging between 600 and 750 degrees centigrade, in the presence of air which is mixed with the products of combustion required to maintain the necessary reaction temperature, and also in the presence of a contact mass.

2. The process of producing aromatic bodies which consists in the dehydrogenation of petroleum oils containing oils of the carbocyclic series, under a pressure below atmospheric, at temperatures ranging between 600 and 750 degrees centigrade, in the presence of a volume of air ranging from 500 to 800 cubic feet for each 15 or 20 gallons of oil subjected to treatment, said air being mixed with the products of combustion required to maintain said temperature, and also in the presence of a contact mass.

3. The process of producing aromatic bodies which consists in the dehydrogenation of petroleum oils containing oils of the carbocyclic series, under a pressure of from 1 to 4 inches of mercury below atmospheric pressure, at temperatures ranging between 600 and 750 degrees centigrade, in the presence of a volume of air ranging from 500 to 800 cubic feet for each 15 or 20 gallons of oil subjected to treatment, said air being mixed with the products of combustion required to maintain said temperatures and also in the presence of a contact substance.

4. The process of producing aromatic bodies which consists in the dehydrogenation of petroleum oils containing oils of the carbocyclic series, under a pressure below atmospheric, at temperatures ranging between 600 and 750 degrees centigrade, in the presence of air and of the lower oxid of nickel, the air being mixed with the products of combustion required to maintain said temperatures.

5. The process of producing aromatic bodies which consists in the dehydrogenation of petroleum oils containing oils of the carbocyclic series, under a pressure below atmospheric, at temperatures ranging between 600 and 750 degrees centigrade, in the presence of a volume of air ranging from 500 to 800 cubic feet for each 15 to 20 gallons of oil subjected to treatment, said air being mixed with the products of combustion required to maintain said temperatures, and also in the presence of the lower oxid of nickel.

6. The process of producing aromatic bodies which consists in the dehydrogenation of petroleum oils containing oils of the carbocyclic series, under a pressure of from 1 to 4 inches of mercury below atmospheric pressure, at temperatures ranging between 600 and 750 degrees centigrade, in the presence of a volume of air ranging from 500 to 800 cubic feet for each 15 or 20 gallons of oil subjected to treatment, said air being mixed with the products of combustion required to maintain said temperatures, and also in the presence of the lower oxid of nickel.

7. The process of producing aromatic bodies which consists in the dehydrogenation of petroleum oils containing oils of the carbocyclic series, under a pressure below atmospheric, at temperatures ranging between 600 and 750 degrees centigrade, in the presence of air mixed with the products of combustion required to maintain said temperatures and also in the presence of the lower oxid of a metal adapted for dehydrogenation and molecular re-arrangement as described.

In testimony whereof we have signed our names to this specification in the presence of two subscribing witnesses.

FREDERICK WILLIAM MANN.
MARVIN LEE CHAPPELL.

Witnesses for Frederick William Mann:
   WM. F. BOOTH,
   D. B. RICHARDS.

Witnesses for Marvin Lee Chappell:
   A. A. EDWARDS,
   G. M. HENDERSON.